(12) United States Patent
Tan et al.

(10) Patent No.: US 8,109,143 B2
(45) Date of Patent: Feb. 7, 2012

(54) PACKAGING FOR DOWNHOLE PRESSURE TRANSDUCERS

(75) Inventors: Wei-Heong Tan, Sagamihara (JP); Noriyuki Matsumoto, Yokohama (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 310 days.

(21) Appl. No.: 12/335,545

(22) Filed: Dec. 16, 2008

(65) Prior Publication Data
US 2010/0147083 A1 Jun. 17, 2010

(51) Int. Cl.
*G01D 11/24* (2006.01)
(52) U.S. Cl. .......................................... 73/431
(58) Field of Classification Search ................ 73/431, 73/152.47
See application file for complete search history.

(56) References Cited

U.S. PATENT DOCUMENTS

| 6,349,165 | B1 * | 2/2002 | Lock ........................... 385/136 |
| 2007/0079675 | A1 * | 4/2007 | Kronberger ..................... 83/22 |
| 2009/0009036 | A1 * | 1/2009 | Matsumoto et al. ........... 310/348 |
| 2009/0270740 | A1 * | 10/2009 | Keilman et al. ................ 600/486 |
| 2010/0000311 | A1 * | 1/2010 | Nakajima et al. .......... 73/152.47 |

* cited by examiner

*Primary Examiner* — Lisa Caputo
*Assistant Examiner* — Jamel Williams
(74) *Attorney, Agent, or Firm* — Daryl Wright; Jody DeStefanis; Jeff Griffin (57) ABSTRACT

Methods and related systems are described for a sealed housing for downhole transducers. The housing system includes a housing body and a transducer positioned within the housing body, and one or more flexible members sealably mounted on the housing body. The flexible members each have one or more undulations which facilitate movement of the flexible member in directions primarily perpendicular to the surface of the flexible member. The dimensions of the one or more undulations are designed so as to optimize the ability of the movements of the member thereby accommodating volume changes in the sealed housing. A substantial amount of compensating material can also be positioned within the housing body. The compensating material has a coefficient of thermal expansion substantially less than that of the housing material.

37 Claims, 12 Drawing Sheets

PACKAGING FOR DOWNHOLE PRESSURE TRANSDUCERS

BACKGROUND OF THE INVENTION

1. Field of the Invention

This patent specification relates to packaging for downhole pressure transducers and, more particularly, to techniques for providing volume changes and/or reduced thermally induced pressure changes in sealed containers for downhole pressure transducers.

2. Background of the Invention

In measuring pressure in a downhole environment, a variety of pressure transducer technologies can be used. For example, helical bourdon tube gauges, strain gauges, quartz crystal gauges, and MEMs based sensors have been proposed and/or used downhole. For downhole applications, the pressure transducer is typically sealed in a package so as to isolate the transducer from the harsh downhole environment. For example, the packaging serves to protect the transducer from caustic and potentially fouling oil and/or drilling mud found in the downhole environment. Within the sealed package a substance such as silicone oil can be used to transmit the pressure to the transducer. Silicone oil is often used due to its relatively low compressibility, high boiling point and inertness. In order for the sealed packaging to be effective, the package must not only isolate the inner and outer environments. The package should also adequately transmit the pressure from the outside of the package to the inside by changing its volume in response to the external pressure change. Furthermore, the package for downhole use also needs to be able to change its volume to accommodate relatively large changes in temperature between the surface and various downhole environments.

In conventional designs, a bellows system is typically used to provide the needed isolation and pressure transmission capabilities. A bellow system is characterized in that the primary direction motion is primarily perpendicular to the surface of the bellows. However, bellows systems tend to be rather large relative the sensor package, and are prone to problems such as mud clogging. Mud may get into the bellows grooves and harden, thereafter preventing the bellows from operating properly. Bellow systems are also relatively difficult to clean thereby making it more difficult to avoid problems such as mud clogging. Finally, bellow systems are prone to damage and/or malfunction due to shock when operating in a rugged downhole environment. This is especially true when the bellows aspect ratio is long. Thus, it is desirable to provide a downhole pressure transducer package that alleviates some or all of the drawbacks with conventional bellows arrangements.

As will become apparent from the following description and discussion, the present invention overcomes at least some of these deficiencies and provides an improved pressure transducer housing.

SUMMARY

According to embodiments, a sealed housing system for a downhole transducer is provided. The housing system includes a housing body and a transducer positioned within the housing body, and a flexible member sealably mounted on the housing body. The flexible member has one or more undulations which facilitate movement of the flexible member in directions primarily perpendicular to the surface of the flexible member. The dimensions of the one or more undulations are designed so as to enhance the ability of the movements of the member thereby accommodating volume changes in the sealed housing.

According to some embodiments, sealed housing system for a downhole transducer is provided which includes a housing body, a transducer positioned within the housing body, and two or more flexible planar members each sealably mounted on the housing body. Each flexible member has one or more undulations which facilitate movement of the flexible member in directions primarily perpendicular to the surface of the flexible member thereby accommodating volume changes in the sealed housing.

According to other embodiments, a sealed housing system for a downhole transducer is provided which includes a housing body made of primarily a housing material, a transducer positioned within the housing body, and a substantial amount of compensating material positioned within the housing body. The compensating material has a coefficient of thermal expansion substantially less than that of the housing material.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PREFERRED EMBODIMENTS

In the following detailed description of the preferred embodiments, reference is made to accompanying drawings, which form a part hereof, and within which are shown by way of illustration specific embodiments by which the invention may be practiced. It is to be understood that other embodiments may be utilized and structural changes may be made without departing from the scope of the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

Figure 1:
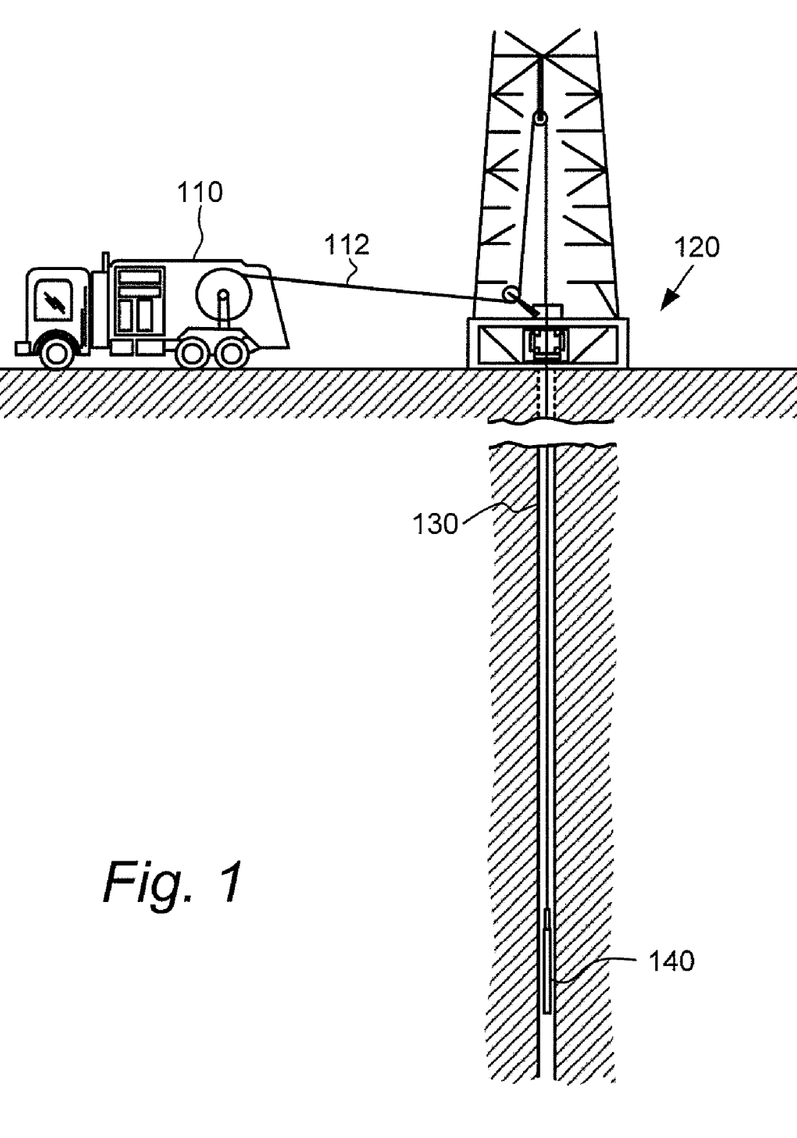
FIG. 1 shows a typical downhole setting for downhole pressure transducer housing, according to embodiments.

FIG. 1 shows a typical downhole setting for downhole pressure transducer housing, according to embodiments. Shown in FIG. 1 is wireline truck 110 deploying wireline cable 112 into well 130 via well head 120. Wireline tool 140 is disposed on the end of the cable 112. According to one example, wireline tool 140 is a downhole sampling tool such as the Modular Formation Dynamics Tester tool from Schlumberger. Within tool 140 are one or more downhole pressure transducers each housed in a sealed container. The harsh downhole environment typically exposes the sealed transducer container to harsh corrosive substances, as well as large temperature pressure fluctuations.

According to some embodiments, an improved diaphragm design is used on an enclosed downhole container housing a pressure transducer. The diaphragm is used as a pressure compensator that allows for volume changes while physically isolating the contents of the container from its exterior. Commercially available diaphragms typically include a waved surface with each wave having a constant height and with the waves being evenly spaced radially from the center of the diaphragm. However, it has been found that this design is not very well optimized in terms of maximizing diaphragm deflection. By providing a more optimized diaphragm design, the ability of the diaphragm to accommodate larger volume changes is increased.

Figure 2:
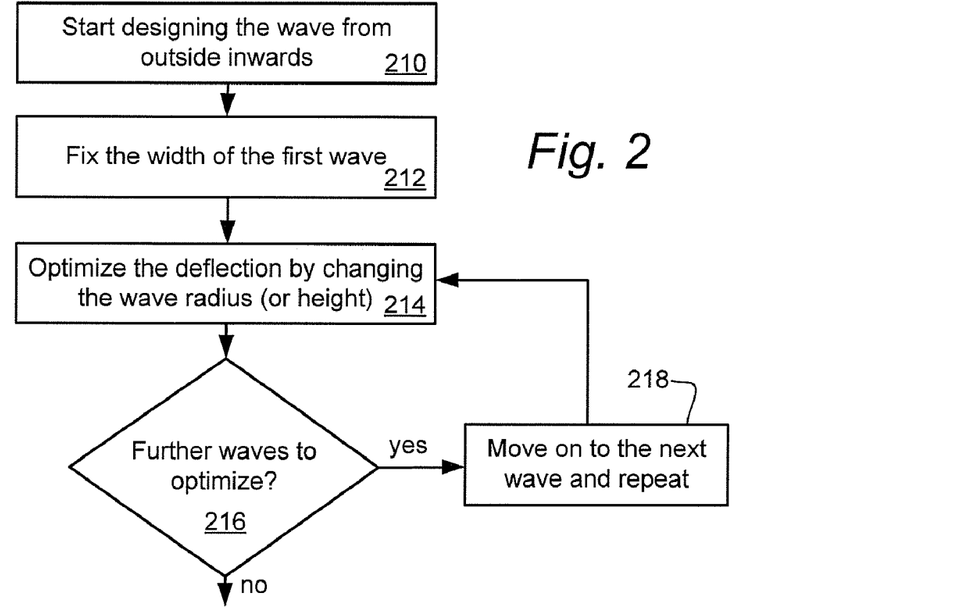
FIG. 2 is a flow chart showing basic steps involved in designing a diaphragm, according to some embodiments.

FIG. 2 is a flow chart showing basic steps involved in designing a diaphragm, according to some embodiments. The diameter of the diaphragm is selected based on the available space on the transducer housing. The method in FIG. 2 chooses a fixed width wave and optimizes deflection by changing the curve radius or height for each wave. In the Step 210, the design optimization is started by focusing first on the outermost wave. In step 212 the width of the first wave is fixed. In step 214, the deflection of the wave is optimized by varying the wave height or wave curvature radius, as will be described in further detail below. In step 216, a check is made to determine if there are still further waves to optimize. If there are, the next wave is selected in 218 and the optimization is repeated.

Figure 3:
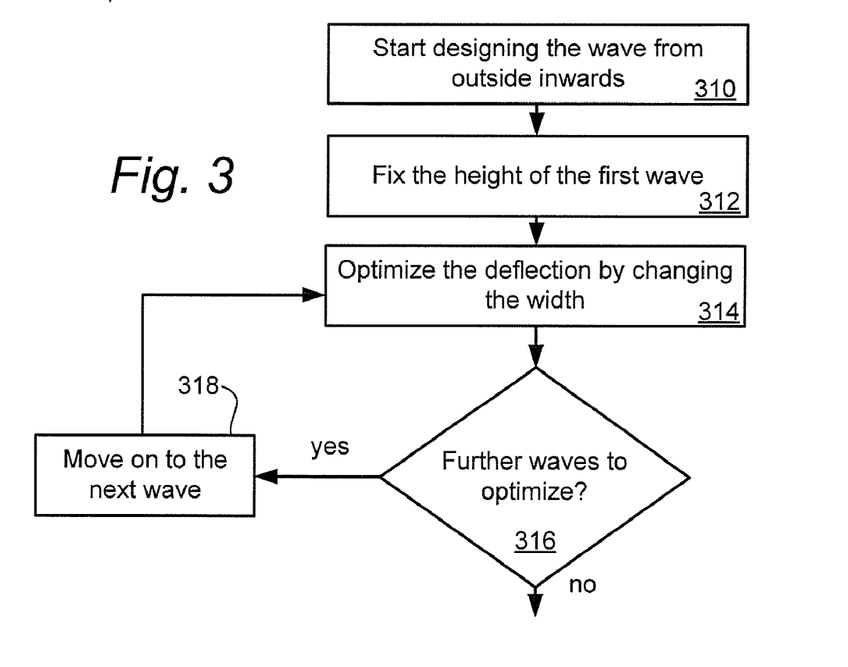
FIG. 3 is a flow chart showing basic steps involved in designing a diaphragm, according to some other embodiments.

FIG. 3 is a flow chart showing basic steps involved in designing a diaphragm, according to some other embodiments. As in the case of FIG. 2, the diameter of the diaphragm is selected based on the available space on the transducer housing. The method in FIG. 3 chooses a fixed wave height (or radius) and optimizes deflection by changing the width of each wave. In the Step 310, the design optimization is started by focusing first on the outermost wave. In step 312 the height of the first wave is fixed. In step 314, the deflection of the wave is optimized by varying the width of the wave, as will be described in further detail below. In step 316, a check is made to determine if there are still further waves to optimize. If there are, the next wave is selected in 318 and the optimization is repeated.

Figure 4:
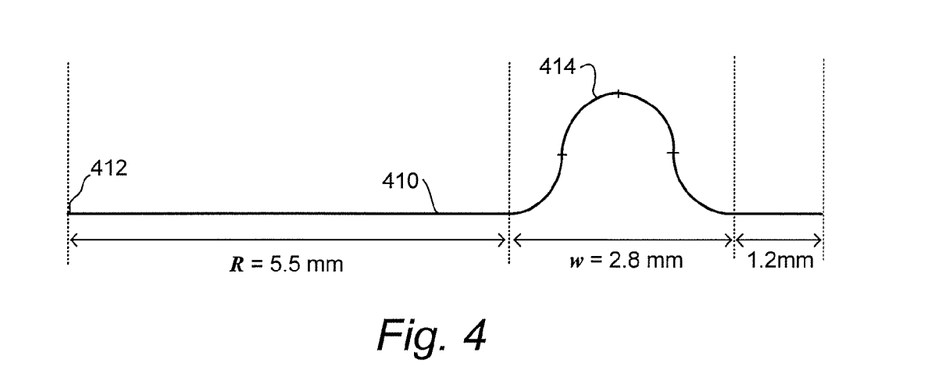
FIG. 4 is a diagram illustrating a diaphragm design optimization, according to some embodiments.

FIG. 4 is a diagram illustrating a diaphragm design optimization, according to some embodiments. Curve 410 is a profile of a diaphragm having a center point 412 and a single circular wave 414 at starting at radius R=5.5 mm. The width of the wave w=2.8 mm.

Figure 5:
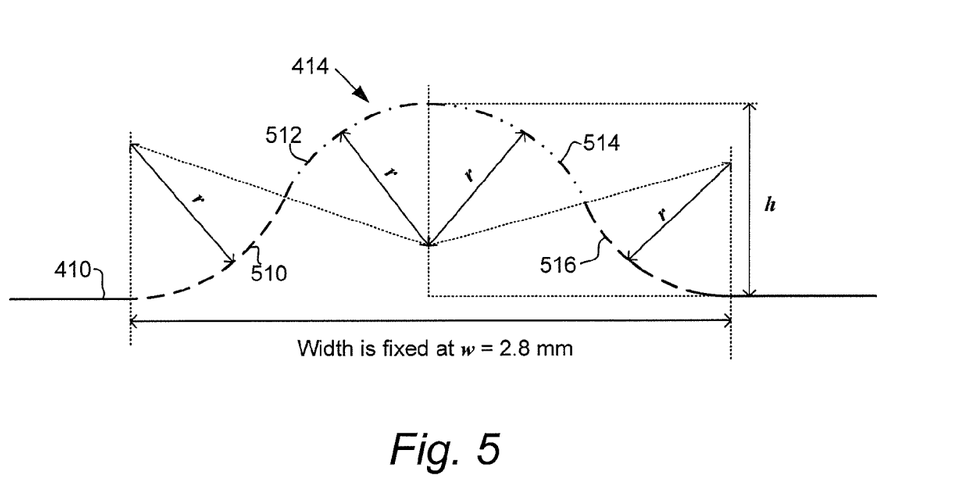
FIG. 5 is a diagram illustrating further detail of the wave portion of the diaphragm shown in FIG. 4, according to some embodiments.

FIG. 5 is a diagram illustrating further detail of the wave portion of the diaphragm shown in FIG. 4, according to some embodiments. As in FIG. 4, curve 410 is a profile of a diaphragm having a single wave 414. As shown, wave 414 can be broken up into four sections, namely sections 510, 512, 514, and 516. In the example shown, each of the portions have the same radius=r. According to other embodiments, waves can be designed having different r values for different sections. As shown, the width of the wave 414 is fixed at 2.8 mm. The height h of the wave 414 depends on the value of r for the sections 510, 512, 514, and 516.

Figure 6:
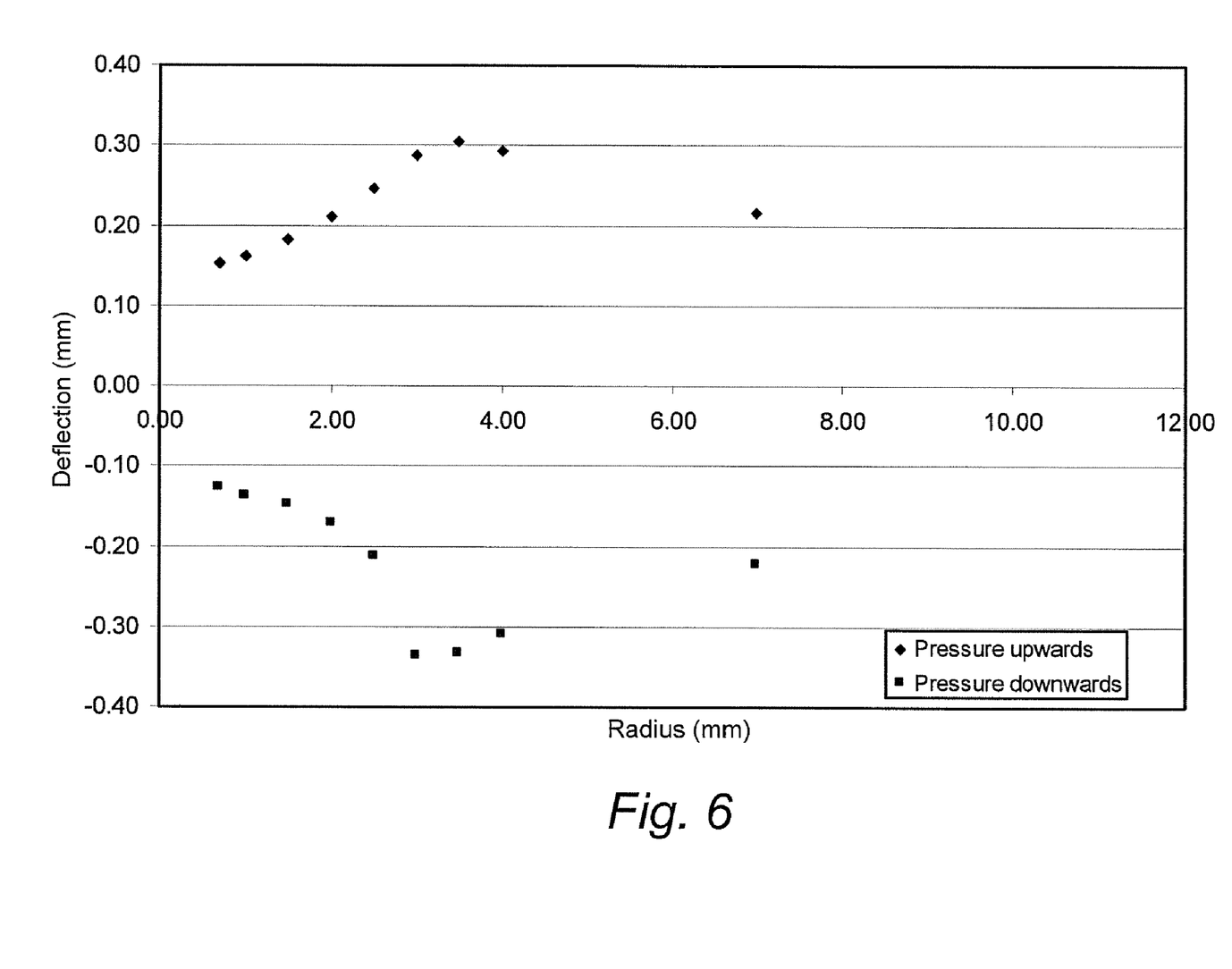
FIG. 6 is a plot showing deflection values for different radius values for the diaphragm design shown in FIGS. 4-5.

FIG. 6 is a plot showing deflection values for different radius values for the diaphragm design shown in FIGS. 4-5. The deflection values are the results of numerical analysis software ANSYS® from ANSYS, Inc. The upper portion of plot 610 shows deflection distances for upwards pressure on the diaphragm, while the lower portion of plot 610 shown deflection distances for downwards pressure on the diaphragm. As can be seen from plot 610, the maximum and minimum deflection occurs as slightly different values of r, as the design is not symmetrical. From the plot 610, an optimal radius r is selected so as to maximize the deflection for an applied pressure. Based on the data shown in FIG. 6, a wave radius r=3.5 mm is found to be optimal. The value of r=3.5 mm and a wave width w=2.8 mm yields a wave height h≈0.1414 mm, for wave 414 shown in FIGS. 4 and 5. According to some embodiments, the material used for the diaphragm is Hastelloy C22 having a thickness of about 20-25 microns. According to other embodiments, alternative materials are used depending on the anticipated environment. For example, materials such as Haselloy 625 or stainless steel could be used.

Figure 7:
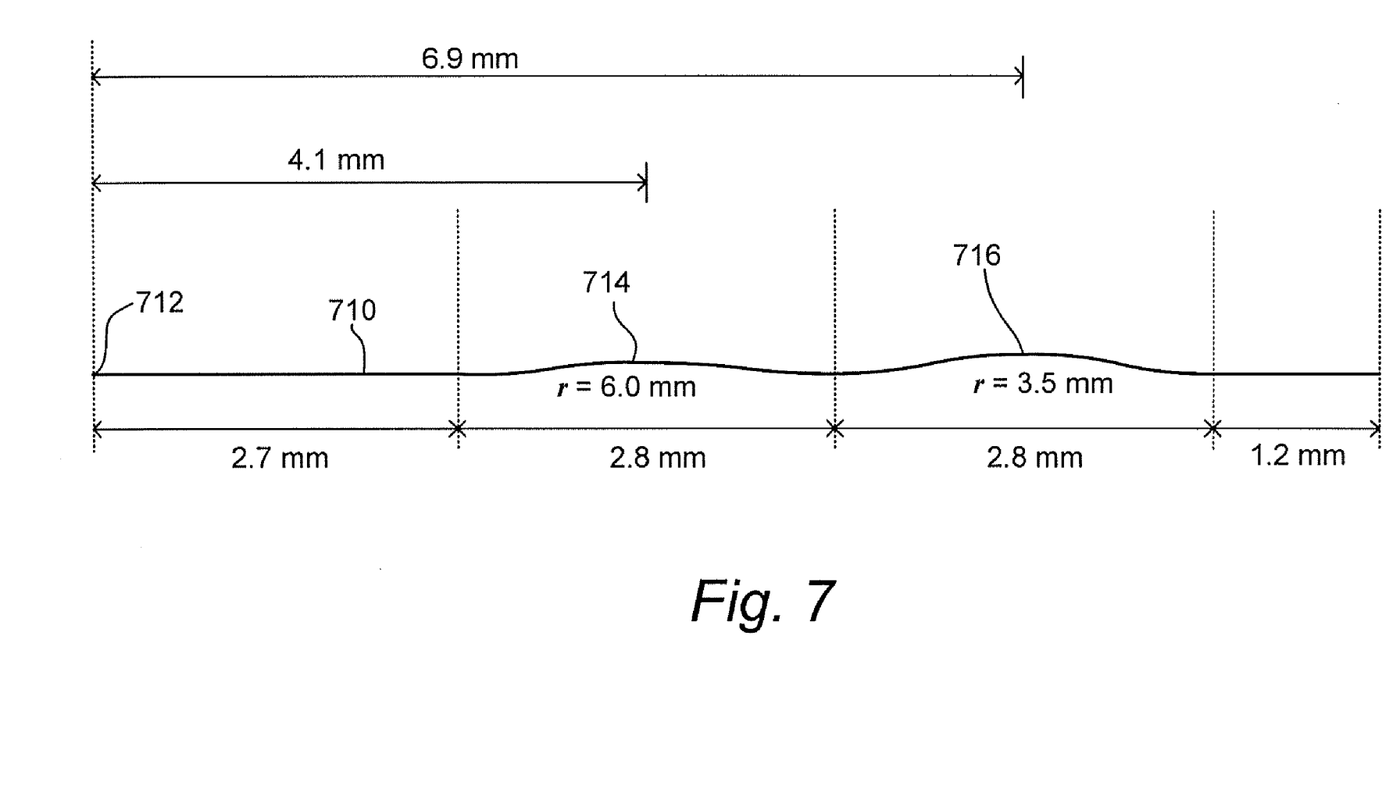
FIG. 7 is a diagram illustrating a diaphragm design optimization, according to some embodiments.

FIG. 7 is a diagram illustrating a diaphragm design optimization, according to some embodiments. Curve 710 is a profile of a diaphragm having a center point 712 and two circular waves 714 and 716. The inner wave 714 is located such that it has radius from the center R=2.7 mm. The outer wave 716 is located such that it has a radius from the center R=5.5 mm. The width for both waves 714 and 716 are fixed at w=2.8 mm. Following the steps of the flowchart shown in FIG. 2, the optimization process is carried out first for the outermost wave 716, by fixing the width at w=2.8 mm, and a position of R=5.5 mm for wave 716, the optimum value of r=3.5 mm can be obtained from the data as shown in FIG. 6 and discussed above. As in the case illustrated in FIG. 6, a value of r=3.5 mm and a wave width w=2.8 mm yields a wave height h≈0.1414 mm, for wave 714 shown in FIG. 7. Next, the optimization process is repeated for the next wave, namely wave 714, which has a location of R=2.7 mm and a fixed width of w=2.8 mm.

Figure 8:
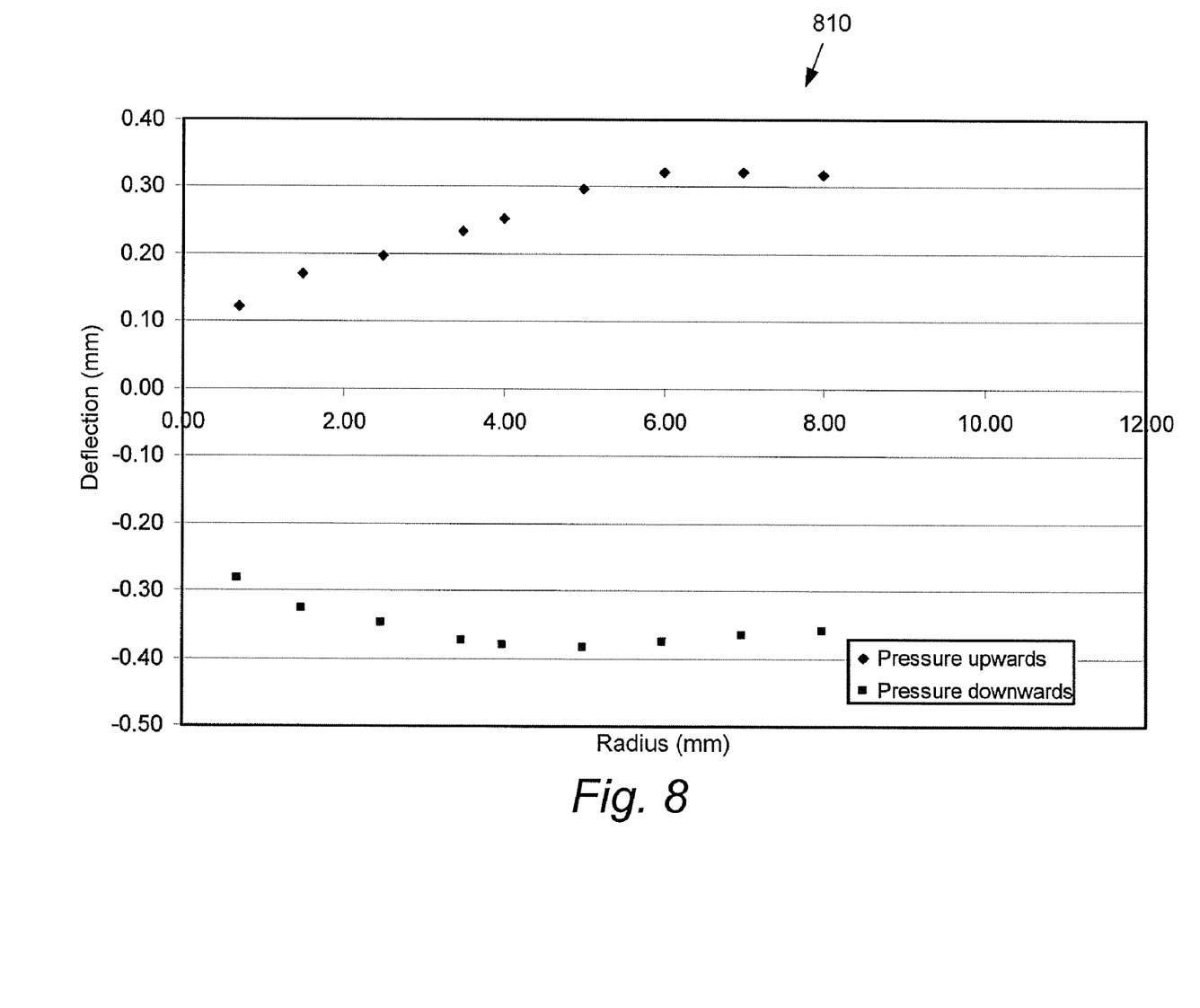
FIG. 8 is a plot showing measured deflection values for different radius values for the inner wave of the diaphragm design shown in FIG. 7.

FIG. 8 is a plot showing measured deflection values for different radius values for the inner wave 716 of the diaphragm design shown in FIG. 7. The upper portion of plot 810 shows deflection distances for upwards pressure on the diaphragm, while the lower portion of plot 810 shown deflection distances for downwards pressure on the diaphragm, for different values of r for the wave 716. As can be seen from plot 810, as in the case of FIG. 6, the maximum and minimum deflection occurs as slightly different values of r, as the design is not symmetrical. From the plot 810, an optimal radius r for the wave 716 is selected so as to maximize the deflection for an applied pressure. Based on the data shown in FIG. 8, a wave radius r=6 mm is found to be optimal for wave 716. The value of r=6 mm and a wave width w=2.8 mm yields a wave height h≈0.0819 mm, for wave 716 shown in FIG. 7.

Figures 9, 10, 11:
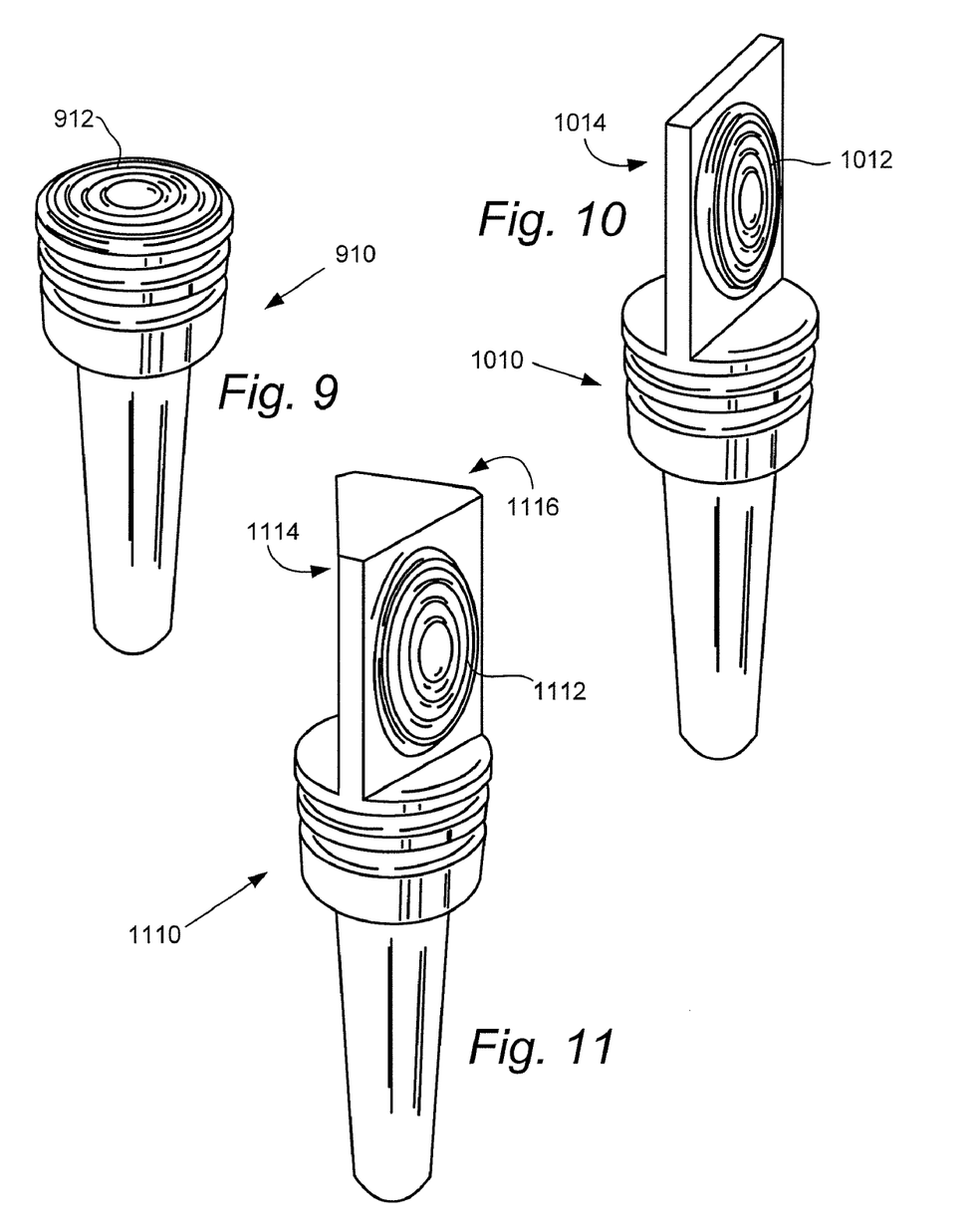
FIG. 9 shows an enclosed container for a downhole pressure transducer having a single diaphragm, according to embodiments.
FIG. 10 shows an enclosed container for a downhole pressure transducer having two diaphragms, according to some embodiments.
FIG. 11 shows an enclosed container for a downhole pressure transducer having three diaphragms, according to other embodiments.
Figure 12:
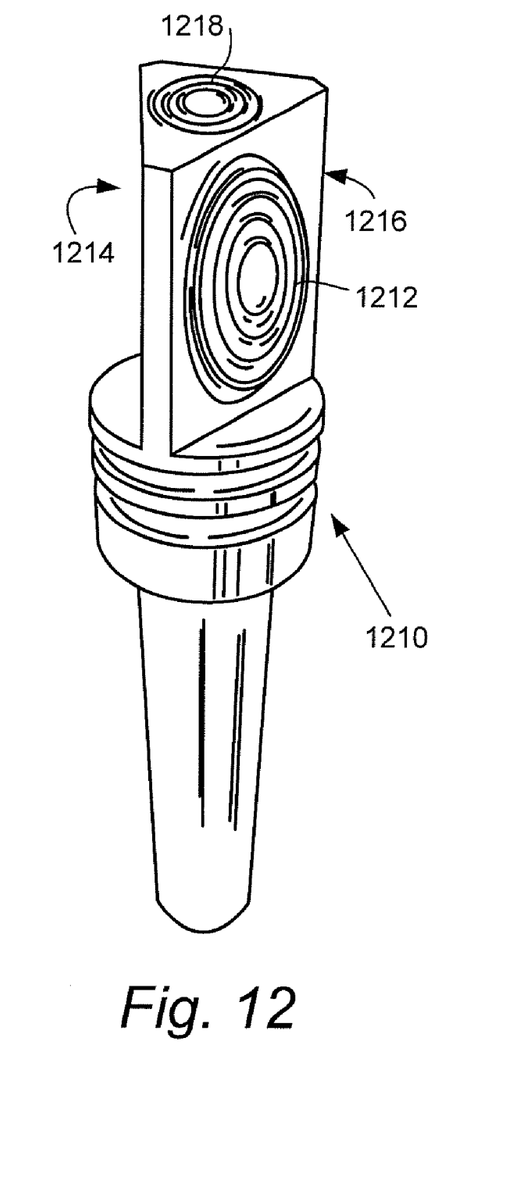
FIG. 12 shows an enclosed container for a downhole pressure transducer having four diaphragms.
Figure 13:
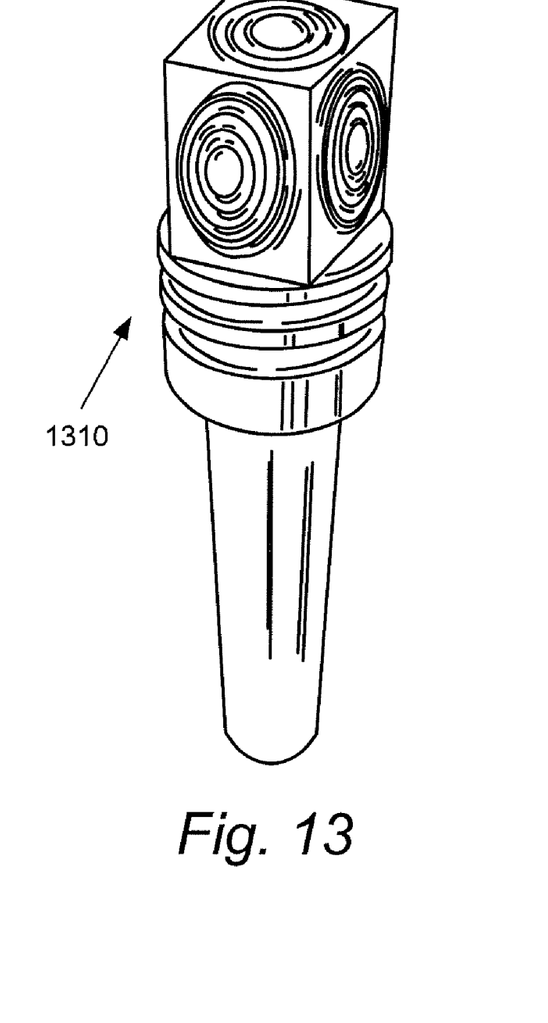
FIG. 13 shows an enclosed container for a downhole pressure transducer having five diaphragms.

FIG. 9 shows an enclosed container 910 for a downhole pressure transducer having a single diaphragm 912, according to embodiments. The waves on diaphragm 912 are preferably designed according to the foregoing discussion so as to maximize deflection diaphragm 912. FIG. 10 shows an enclosed container 1010 for a downhole pressure transducer having two diaphragms, according to some embodiments. The two diaphragms, 1012 and 1014 are positioned on either side of the rectangular protrusion on container 1010. By having two diaphragms the overall ability of the container to adjust to volume changes has increased accordingly. FIG. 11 shows an enclosed container 1110 for a downhole pressure transducer having three diaphragms 1112, 1114, and 1116, according to other embodiments. FIG. 12 shows an enclosed container 1210 for a downhole pressure transducer having four diaphragms 1212, 1214, 1216 and 1218. FIG. 13 shows an enclosed container 1310 for a downhole pressure transducer having five diaphragms. Those of ordinary skill in the art will understand that other designs are possible having other configurations and having other numbers of diaphragms to accommodate expected volume changes within the design constraints of the particular application.

Figure 14:
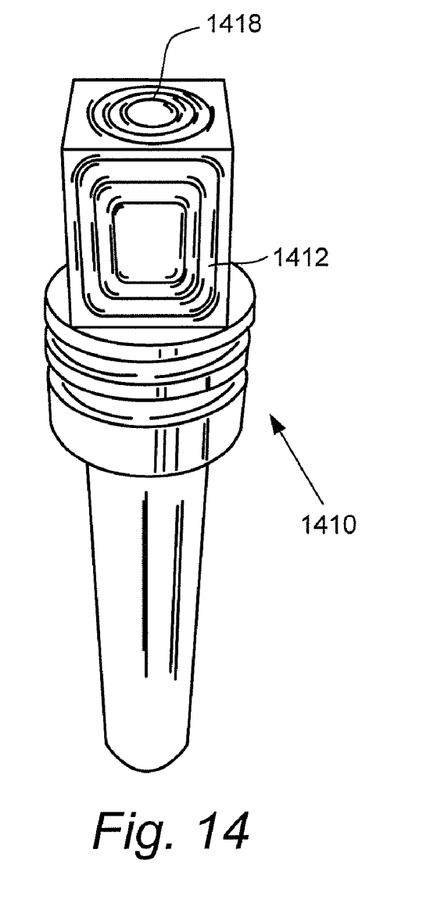
FIG. 14 shows an enclosed container for a downhole pressure transducer, according other embodiments.

FIG. 14 shown an enclosed container 1410 for a downhole pressure transducer, according other embodiments. In this example, the planar diaphragm 1412 is rectangular in shape, rather than circular. The rectangular design makes more efficient use of the available space on the housing body. Also shown in FIG. 14 is a circular diaphragm 1418. Not shown are three other rectangular planar diaphragms on the other three sides of the rectangular portion of container 1410.

Figure 15:
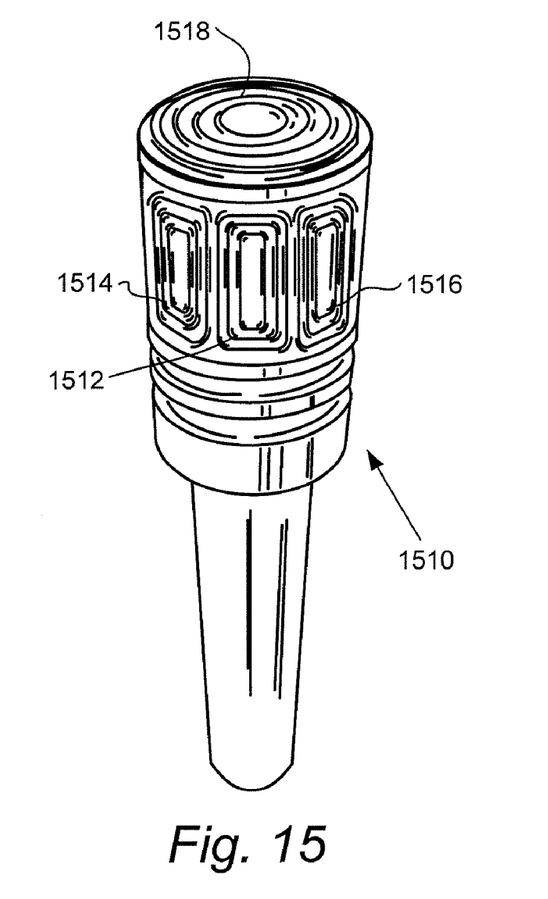
FIG. 15 shows an enclosed container for a downhole pressure transducer, according to other embodiments.

FIG. 15 shows an enclosed container 1510 for a downhole pressure transducer, according to other embodiments. In the example shown in FIG. 15, the outer surface of the upper curved portion of the housing 1510 is made up of a number of rectangular diaphragm members. Note that since the housing is curved, the diaphragms are also curved rather than planar. Shown in FIG. 15 are rectangular diaphragms 1512, 1514 and 1516. Also shown on the upper surface of the housing is a circular planar diaphragm 1518. Although the curved diaphragm arrangement as shown in FIG. 15 may be suitable for many applications, there are some advantages of using flat diaphragms instead. For example, the manufacturability of flat diaphragms may be significantly easier and therefore more inexpensive. Also, the typical size of a package such as shown in FIGS. 9-15 for a quartz crystal gauge pressure transducer is less than 100 ml. Even more typical, the size of the package is less than 50 ml. At such sizes, the flat diaphragm arrangements such as shown in FIG. 9-14 can be easier to handle during manual assembly.

While the foregoing discussion has focused on how to increase the volume adjusting capability of a sealed container for downhole pressure transducers, according to some embodiments, material inside the sealed container is introduced so as to lessen the amount of volume changes needed due to thermal changes. Advantageously, it has been found that by introducing certain materials in the sealed container, the bellows system and/or diaphragm systems is required to absorb smaller changes in internal pressure of sealed containers when exposed to environmental temperature fluctuations. It has been found that by introducing material with low coefficient of thermal expansion (CTE or $\zeta$), the effects of materials with higher CTE inside the sealed container during expansion/contraction can be to some extent countered. This method eliminates or reduces the changes in internal pressure of a sealed container brought about by temperature changes, allowing a reduction in bellows size.

Figure 16A:
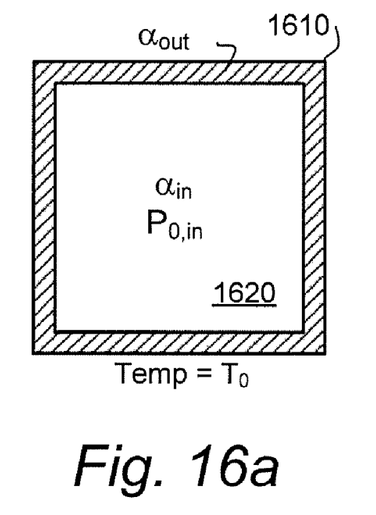
FIGS. 16a-d are diagrams illustrating the effect of increased temperature on different sealed containers.
Figure 16B:
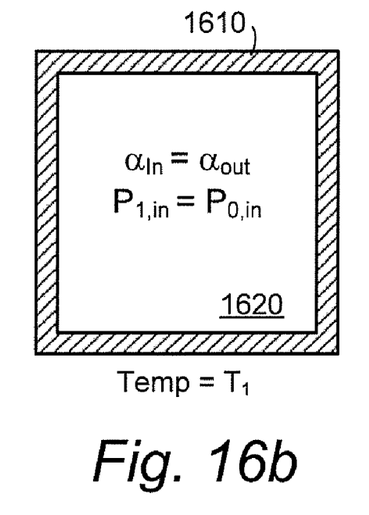
Figure 16C:
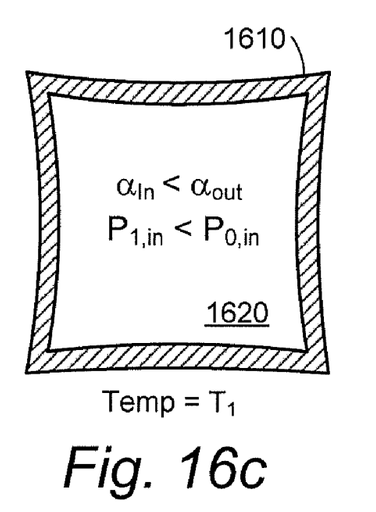
Figure 16D:
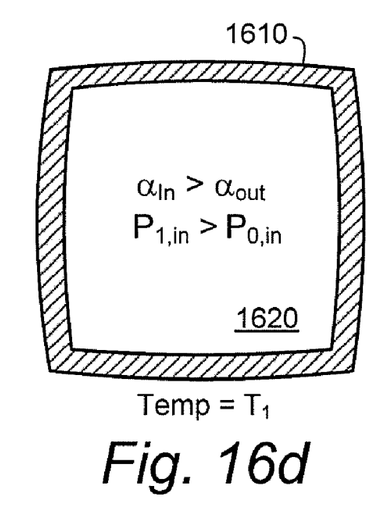

FIGS. 16a-c are diagrams illustrating the effect of increased temperature on different sealed containers. In FIG. 16a, sealed container 1610 is filled with a liquid 1620. The container has an internal pressure $P_{0,in}$ at a temperature $T_0$. The container has a CTE of $\zeta_{out}$ and the internal liquid 1620 has a CTE of $\zeta_{in}$. When the surrounding temperature is raised to $T_1$, three possible cases can arise that are illustrated in FIGS. 16b-d. In FIG. 16b, both content liquid 1620 and container 1610 have the same thermal expansion coefficient ($\zeta_{in}=\zeta_{out}$). In this case the internal pressure remains the same (i.e. $P_{1,in}=P_{0,in}$). In FIG. 16c, the container 1610 has a larger thermal expansion coefficient than its contents 1620 (i.e. $\zeta_{in}<\zeta_{out}$). Container 1610 expands more then its content 1620 resulting in a reduction in internal pressure (i.e. $P_{1,in}<P_{0,in}$). In FIG. 16d, the container 1610 has a smaller thermal expansion coefficient than its contents 1620 (i.e. $\zeta_{in}>\zeta_{out}$). Container 1610 expands less then its contents 1620 resulting in an increase in internal pressure, i.e. $P_{1,in}>P_{0,in}$. Note that for a reduction in temperature, i.e. if $T_1<T_0$, we will have an increase in internal pressure for the case shown in FIG. 16c and a reduction in internal pressure for the case shown in FIG. 16d.

Figure 17:
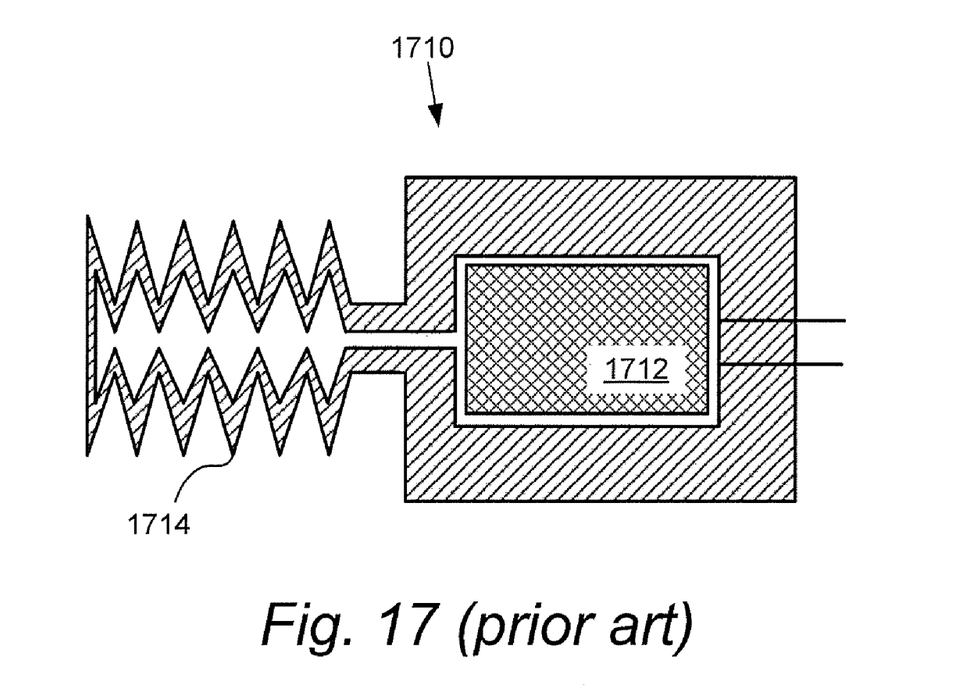
FIG. 17 shows a schematic of a conventional sealed container design for a downhole quartz pressure gauge.

FIG. 17 shows a schematic of a conventional sealed container design for a downhole quartz pressure gauge. Container 1710 includes bellows 1714 that are attached to a sealed container 1710 containing a quartz guage 1712 immersed in silicone oil. As CTE of the silicone oil ($CTE_{silicone\ oil}$) is much greater than the CTI of the container material ($CTE_{out}$), a relatively large bellows 1714 is typically used to allow for the expansion of the silicone oil. The large bellows 1714 can pose problems such as for example during cleaning and maintenance as mud tends to get stuck in-between the grooves of the bellows.

Figure 18:
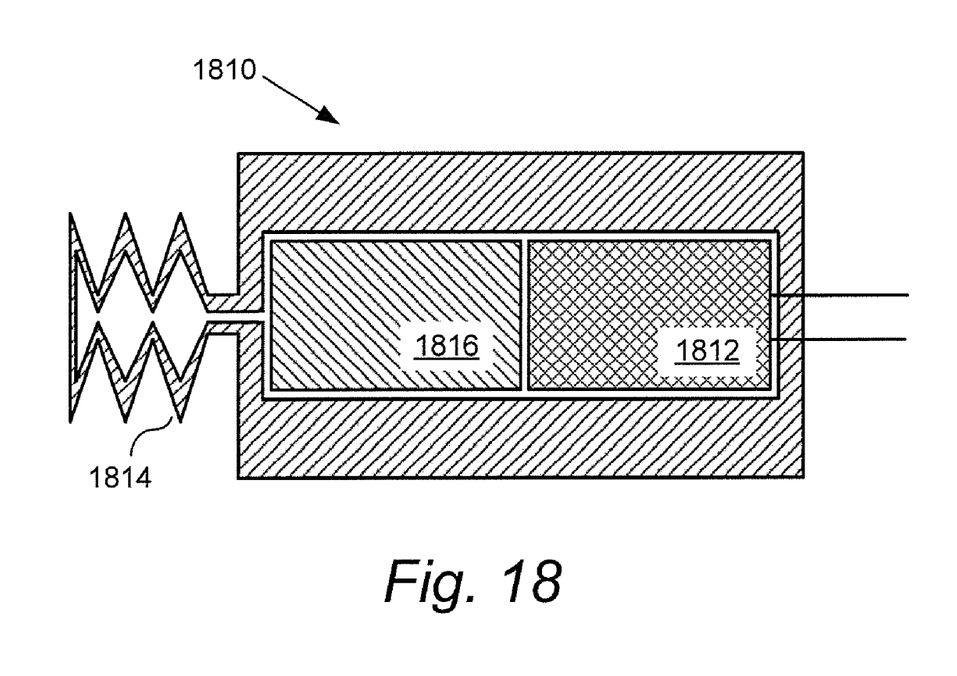
FIG. 18 shows a schematic of a sealed container design for a downhole pressure transducer, according to some embodiments.

FIG. 18 shows a schematic of a sealed container design for a downhole pressure transducer, according to some embodiments. Container 1810 includes bellows 1814 and pressure transducer 1812, such as a quartz pressure gauge. It has been found that the internal stresses brought about by temperature changes inside a sealed container can be significantly decreased by introducing a material 1816 having a relatively low CTE ($CTE_x$) into the sealed container 1810. During temperature fluctuations, large volumetric changes of high CTE materials (such as silicone oil) can be balanced by small volumetric changes of material 1816 with a low CTE. In designing the sealed container, the total volumetric changes of the contents should be matched to that of the container's internal volume, so as to minimize the internal stresses brought about by temperature changes. As a result, smaller bellows 1814 can be used to allow for the expansion of a sealed container's contents. Examples for low CTE materials which can be used for material 1816 includes Invar, Kovar, Quartz, and diamond. According to some embodiments, a negative CTE can be used such as Zirconium tungstate.

Figure 19:
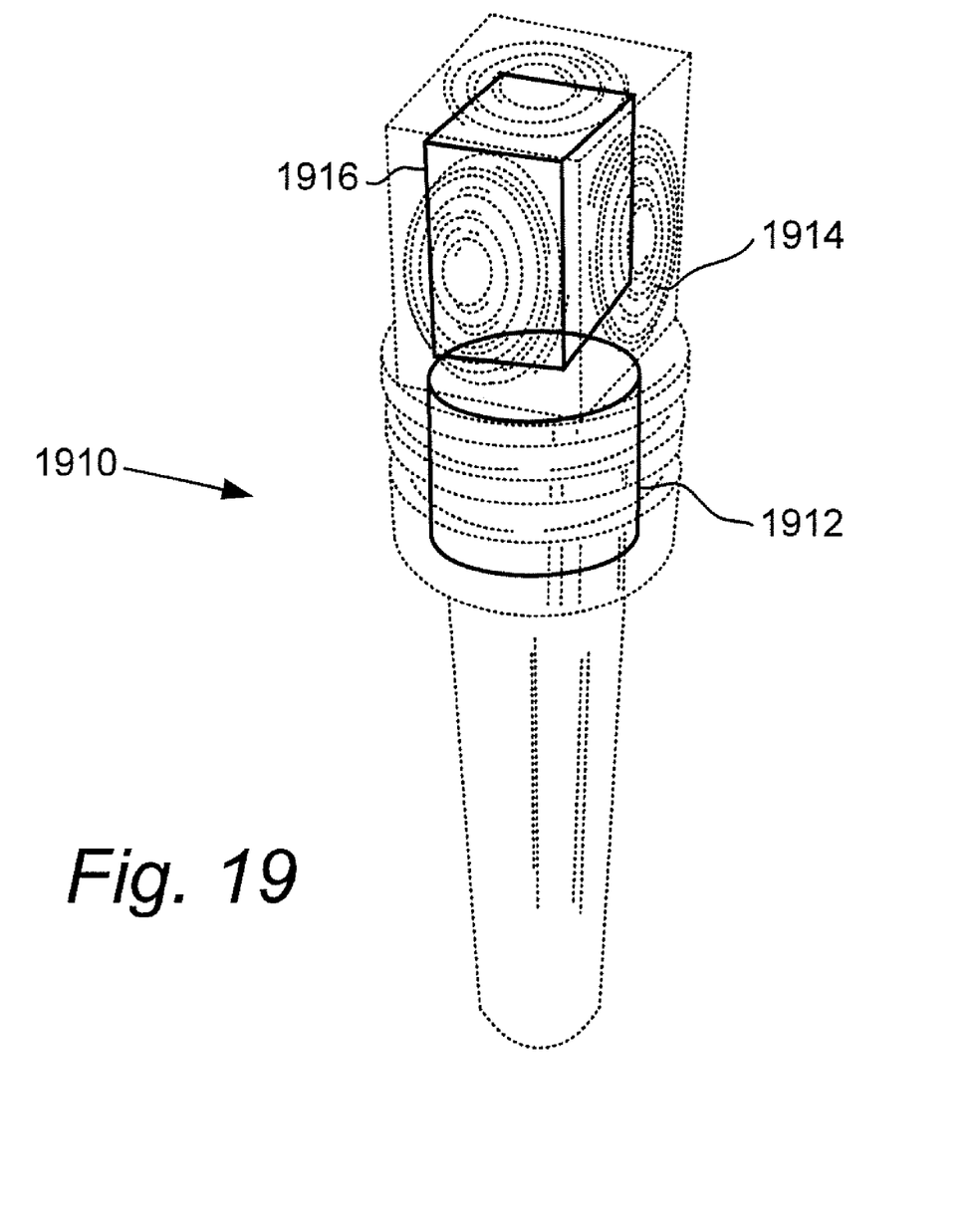
FIG. 19 shows an example of a downhole pressure transducer sealed container according to some embodiments.

FIG. 19 shows an example of a downhole pressure transducer sealed container according to some embodiments. Sealed container 1910 includes multiple diaphragms such as diaphragm 1914 that can be designed with waves shaped according to the techniques described herein. Pressure transducer 1912 can be for example a quartz pressure transducer such as described in co-pending U.S. patent application Ser. No. 11/772,244 filed on Jul. 2, 2007, which is incorporated by reference herein. Low or negative CTE material 1714 is included so as to minimize the internal stresses brought about by temperature changes.

While the embodiments described have primarily pertained to sealed housings for downhole pressure transducers, the techniques and structures are also applicable to other types of sensors. For example, a crystal quartz temperature sensor can be used with the housings described. According to some embodiments, the sealed housings as described herein are used to house a crystal quarts transducer that can operate to detect pressure and/or temperature.

Whereas many alterations and modifications to the embodiments described herein will no doubt become apparent to a person of ordinary skill in the art after having read the foregoing description, it is to be understood that the particular embodiments shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A sealed housing system for a downhole transducer comprising:
 a housing body;
 a transducer positioned within the housing body; and
 a flexible member sealably mounted on the housing body, the flexible member having one or more undulations which facilitate movement of the flexible member in directions primarily perpendicular to the surface of the flexible member,
 wherein each of the one or more undulations is a circular wave,
 wherein the dimensions of the one or more undulations being designed with parameters including a height and a width of the circular wave so as to enhance the ability of the movements of the member thereby accommodating volume changes in the sealed housing, and
 wherein, when one of the height and the width of the outermost circular wave being fixed, the rest of the parameters being changed to optimize deflection of the circular wave inward.

2. A sealed housing system according to claim 1 wherein the flexible member is substantially planar in shape.

3. A sealed housing system according to claim 2 wherein the flexible member is substantially circular in shape.

4. A sealed housing system according to claim 1 wherein the one or more undulations include two or more concentric circular waves having dimensions designed so as to optimize the ability of the movements of the member to accommodating volume changes in the sealed housing.

5. A sealed housing system according to claim 4 wherein the circular waves having larger diameters have greater amplitudes than those having smaller diameters.

6. A sealed housing system according to claim 2 comprising two or more flexible planar members.

7. A sealed housing system according to claim 6 comprising three or more flexible planar members.

8. A sealed housing system according to claim 7 comprising four or more flexible planar members.

9. A sealed housing system according to claim 1 wherein the transducer is a pressure sensor.

10. A sealed housing system according to claim 9 wherein the pressure sensor is a quartz crystal pressure gauge.

11. A sealed housing system according to claim 1 wherein the transducer is able to sense temperature.

12. A sealed housing system according to claim 1 wherein the sealed housing system is filled with silicone oil.

13. A sealed housing system according to claim 1 further comprising a compensating material positioned within the housing, the compensating material having a coefficient of thermal expansion less than that of a primary material of the housing body.

14. A sealed housing system according to claim 13 wherein the compensating material is one or more substances selected from the group consisting of FeNi36, FeNiCo alloys, Quartz, Diamond, and zirconium tungstate.

15. A sealed housing system according to claim 1 wherein the dimensions of the one or more undulations are designed so as to optimize the ability of the movements of the member thereby accommodating volume changes in the sealed housing.

16. A sealed housing system according to claim 1 wherein the flexible member is curved such that it has a circular cross section.

17. A sealed housing system for a downhole transducer comprising:
 a housing body;
 a transducer positioned within the housing body; and
 a flexible member sealably mounted on the housing body, the flexible member having one or more undulations which facilitate movement of the flexible member in directions primarily perpendicular to the surface of the flexible member, wherein the dimensions of the one or more undulations being designed so as to enhance the ability of the movements of the member thereby accommodating volume changes in the sealed housing,
 wherein the housing system has an internal volume of less than about 100 ml.

18. A sealed housing system according to claim 17 wherein the housing system has an internal volume of less than about 50 ml.

19. A sealed housing system for a downhole transducer comprising:
- a housing body;
- a transducer positioned within the housing body; and
- two or more flexible planar members each sealably mounted on the housing body, each flexible member having one or more undulations which facilitate movement of the flexible member in directions primarily perpendicular to the surface of the flexible member thereby accommodating volume changes in the sealed housing, wherein, when a height a width of the outermost undulation is fixed, the rest being designed so as to optimize deflection of the one or more undulations inward.

20. A sealed housing system according to claim 19 wherein each of the planar members are circular in shape.

21. A sealed housing system according to claim 20 wherein the undulations include two or more concentric circular waves, such that the circular waves having larger diameters have greater amplitudes than those having smaller diameters.

22. A sealed housing system according to claim 19 wherein at least one of the planar members is rectangular is shape.

23. A sealed housing system according to claim 19 comprising three or more flexible planar members.

24. A sealed housing system according to claim 23 comprising four or more flexible planar members.

25. A sealed housing system according to claim 19 further comprising a compensating material positioned within the housing, the compensating material having a coefficient of thermal expansion less than that of a primary material of the housing body.

26. A sealed housing system according to claim 19 wherein at least one of the flexible members is curved such that it has a circular cross section.

27. A sealed housing system for a downhole transducer comprising:
- a housing body;
- a transducer positioned within the housing body; and
- two or more flexible planar members each sealably mounted on the housing body, each flexible member having one or more undulations which facilitate movement of the flexible member in directions primarily perpendicular to the surface of the flexible member thereby accommodating volume changes in the sealed housing, wherein the housing system has an internal volume of less than about 100 ml.

28. A sealed housing system for a downhole transducer comprising:
- a housing body made of primarily a housing material;
- a transducer positioned within the housing body; and
- a compensating material positioned within the housing body, the compensating material having a coefficient of thermal expansion substantially less than that of the housing material.

29. A sealed housing system according to claim 28 wherein the coefficient of thermal expansion is less than that of a primary material used for the transducer.

30. A sealed housing system according to claim 28 wherein the compensating material is primarily made up of one or more substances selected from the group consisting of FeNi36, FeNiCo alloys, Quartz, Diamond, and zirconium tungstate.

31. A sealed housing system according to claim 28 wherein the coefficient of thermal expansion of the compensating material is negative.

32. A sealed housing system according to claim 28 further comprising a flexible member sealably mounted on the housing body, the flexible member having one or more undulations which facilitate movement of the flexible member in directions primarily perpendicular to the surface of the flexible member, wherein the dimensions of the one or more undulations being designed so as to enhance the ability of the movements of the member thereby accommodating volume changes in the sealed housing.

33. A sealed housing system according to claim 32 wherein the flexible member is planar and circular in shape.

34. A sealed housing system according to claim 32 wherein the flexible member is planar and rectangular is shape.

35. A sealed housing system according to claim 32 wherein the dimensions of the one or more undulations are designed so as to optimize the movements of the member thereby accommodating increased volume changes in the sealed housing.

36. A sealed housing system according to claim 32 comprising three or more flexible planar members.

37. A sealed housing system for a downhole transducer comprising:
- a housing body made of primarily a housing material;
- a transducer positioned within the housing body; and
- a substantial amount of compensating material positioned within the housing body, the compensating material having a coefficient of thermal expansion substantially less than that of the housing material,
- wherein the housing system has an internal volume of less than about 100 ml.

* * * * *